United States Patent [19]

Merkle

[11] 4,353,695

[45] Oct. 12, 1982

[54] RETRACTION MECHANISM FOR DENTAL UNITS AND THE LIKE

[75] Inventor: Gerd H. Merkle, Stutensee, Fed. Rep. of Germany

[73] Assignee: Sybron Corp., Rochester, N.Y.

[21] Appl. No.: 141,792

[22] Filed: Apr. 21, 1980

[51] Int. Cl.[3] .................................................. A01C 1/14

[52] U.S. Cl. ........................................................ 433/78

[58] Field of Search ........... 433/78; 137/355.2, 355.23

[56] References Cited

U.S. PATENT DOCUMENTS 3,427,719 2/1969 Gordon et al. ........................ 433/78

3,722,095 3/1973 Gietschmann ........................ 433/78

*Primary Examiner*—Robert Peshock

[57] ABSTRACT

A pneumatically operated piston is used to move an extended utility line back into a dental unit. The unit has a vent valve which permits the free exhaust of air from the unit as the utility line is pulled from the unit. For retraction of the utility line, the application of pneumatic pressure to move the piston also operates to close the vent valve.

4 Claims, 4 Drawing Figures

RETRACTION MECHANISM FOR DENTAL UNITS AND THE LIKE

BACKGROUND OF THE INVENTION

The present invention relates generally to retraction mechanisms for utility supply lines and more particularly to a dental unit or the like wherein fluid pressure is utilized to retract a utility supply line connected to a dental instrument.

It is well known in dental units to have a dental instrument nested in the unit and connected by a cord, hose etc. to a utility supply. It is desirable in such units to provide a mechanism for retracting or pulling the extended utility supply line back into the dental unit when the dental instrument is being returned to a storage position. Conversely, this mechanism must be relatively friction-free so that when the instrument is being manually pulled from the stored to an in-use position there is little or no resistance to the withdrawal of the utility line from the unit.

Various retraction mechanisms are known which allow for the extension of the utility lines out of the unit when the instrument is being moved to an in-use position and which serves the purpose of automatically retracting the utility supply lines back into the dental unit when the instrument is returned to a storage or out-of-use position.

One type of retraction system utilizes a fluid pressure to provide the retraction force. Such systems are shown for example in U.S. Pat. Nos. 3,722,095, 3,427,719 and 3,391,875. In the '719 and '875 patents, the utility line is operatively connected to a piston within a cylinder. A differential pressure is created across the piston by evacuating the rear end of the cylinder. This pulls the piston into to the cylinder, thereby, drawing the connected utility line into the cylinder for storage. The '095 patent creates a differential pressure across the piston by applying pressure to one end of the cylinder. In this case, however, the piston and cylinder arrangement merely provides a motive force for retracting the utility line and the cylinder does not perform the dual function of acting as the housing for the utility line.

In the present invention, the retraction system operates under positive pressure to move the piston within the cylinder to a stored position. Also, in the present invention, the cylinder itself acts as the storage chamber for the utility line. The withdrawal of the utility line from the cylinder and the accompanied movement of the piston is accomplished relatively friction-free in that a relatively large vent means is provided to permit the free exhaust of air from the cylinder as the piston is pulled toward one end of the cylinder by the utility line. As another feature of the invention, a valve for the vent is constructed so as to provide a relatively large vent area while at the same time occupying a minimum of space so that several cylinders can be placed side by side in a relatively small area.

SUMMARY OF THE INVENTION

The retraction mechanism in the present invention may be characterized in one aspect thereof by a cylinder, a piston within the cylinder and a utility line operatively connected to the cylinder so that movement of the utility line out of the cylinder will move the piston toward a front end wall of the cylinder whereas movement of the piston away from the front end wall will draw the utility line back into the cylinder. The cylinder is provided with a vent of a relatively large cross sectional area adjacent the front end wall to permit the free exhaustive air of the cylinder as the withdrawal of the utility line moves the piston toward the front end wall. Attached to the outside of the cylinder and over the vent is a pressure operated valve for sealing the vent when the cylinder is pressurized, this valve being closed simultaneously with the introduction of fluid into the cylinder for moving the piston away from the front end wall.

DESCRIPTION OF THE PREFERRED EMBODIMENTS

Figure 1:
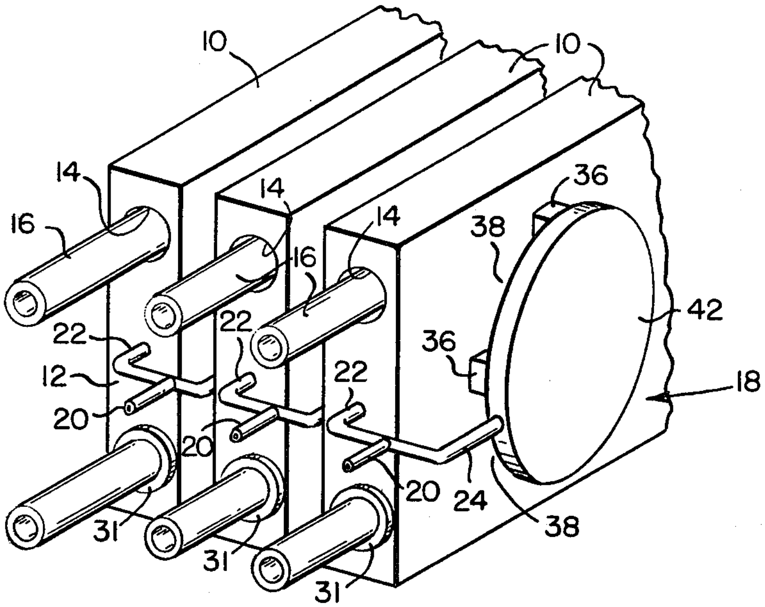
FIG. 1 is a prospective view showing a portion of several individual retraction mechanisms of the present invention positioned side by side.

Referring to the drawings, FIG. 1 shows several retraction mechanisms of the present invention grouped together side by side. In this regard, each individual retraction mechanism includes a cylinder 10 which are generally rectangular in shape. Each cylinder has a front wall 12 proved with an opening 14 that permits the free passage of a utility line 16 into and out of a cylinder.

Fixed to a side wall of each cylinder, adjacent the front end wall, is a valved housing generally indicated at 18. The construction and operation of this valve housing will be described further hereinbelow.

A supply line 20 for fluid under pressure has one branch 22 connected to the cylinder for pressurizing the cylinder and a pressurizing and a second branch 24 connected to valve housing 18 for operating the valve simultaneously with the introduction of the pressurized fluid into the cylinder.

Figure 2:
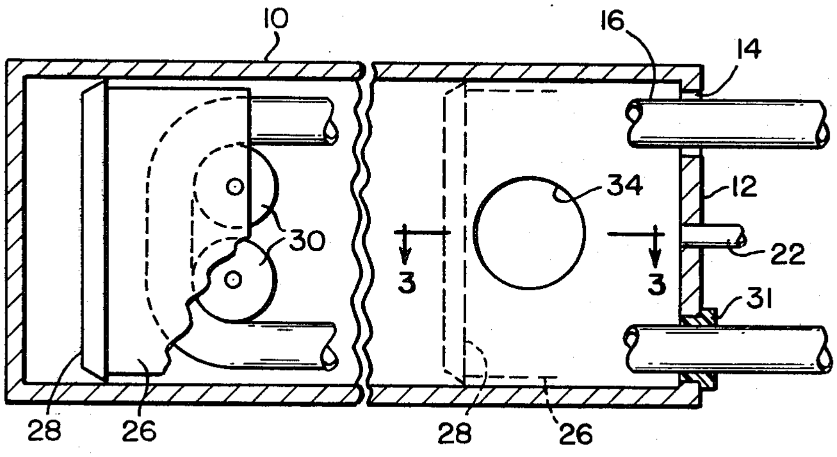
FIG. 2 is a side elevation view of one cylinder partly broken away and in section.

Referring to FIG. 2, one side wall of cylinder 10 has been removed to show its internal components, thus within the cylinder there is a piston 26 shown adjacent the rear of the cylinder so that the utility line 16 is fully retracted and stored within the cylinder. Piston 26 carries a flexible seal 28 about its periphery which slidably engages the internal surfaces of the cylinder to provide a relatively fluid tight, sliding engagement. Journaled to the piston are a pair of pulleys 30 over which the utility line passes for operatively connecting the utility line to the pulley.

As shown in FIG. 2, the utility line is fixed at 31 to the front wall of the cylinder. The utility line then extends into the cylinder over pulleys 30 and then back out through opening 14 in the front wall 12 of the cylinder. With this arrangement, it should be obvious that when the utility line is pulled through opening 14 to extend a dental instrument to a point of use, piston 26 will be carried toward the cylinder front wall 12. Conversely, when air under pressure is introduced through branch line 22, the piston will move to the rear of the cylinder and pull the utility line back to a storage position within the cylinder.

In order to insure that utility line 16 can be pulled to the cylinder with a minimum of effort, it should be appreciated that an outlet must be provided adjacent the front end of the cylinder for venting air from the cylinder as piston moves to the right as viewed in FIG. 2. In this respect, a side wall of the cylinder is provided with a vent opening 34. This opening has a relatively large diameter (about 20 mm in the preferred embodiment) as opposed to being merely a small bleed opening. Such a relatively large vent allows for the free exhaust of air from the cylinder and avoids resistance to the withdrawal of the utility line 16 due to the moving piston compressing air between it and the front wall 12.

The relatively large diameter of vent opening 34 does, however, present a problem when attempting to pressurize the cylinder to move piston 26 to the left as viewed in FIG. 2. In this respect, the opening is sufficiently large so that when piston 26 is in its forward position, as shown in dotted line in FIG. 2, it is difficult if not impossible to pressurize the cylinder as any air entering through branch line 22 can freely exhaust through the uncovered portion of vent opening 34. Accordingly, means must be provided to seal the vent opening in order to permit pressurization of the cylinder and movement of the piston 26 to the left as view in FIG. 2. This sealing is accomplished by a valve mechanism disposed in valve housing 18.

Figure 3:
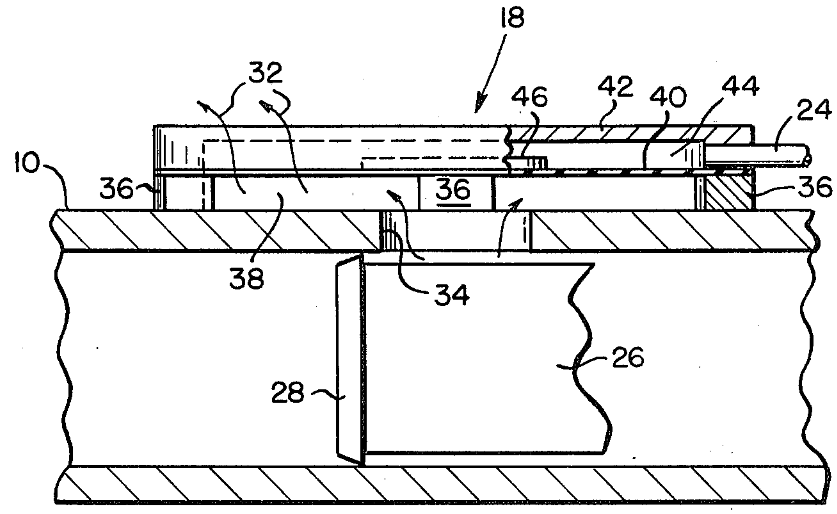
FIG. 3 is a top view of one cylinder on an enlarged scale partly broken away and in section showing the associated valve mechanism in an open position.

FIGS. 1 and 3 show that valve housing 18 is generally the shape of a flat pancake and is considerably larger in diameter than the diameter of vent 34. The housing is connected to the cylinder wall by any suitable means (not shown) and stands on short legs 36 spaced about the periphery of the housing. These legs define several elongated ports 38 which are in communication with vent 34 to permit the exhaust of air from within the cylinder to the atmosphere as shown by arrows 32.

It should be appreciated that the relatively flat pancake shape of valve housing 18 takes up a minimum of horizontal space so that a number of cylinders 10 can be stacked one against the other (as shown for example in FIG. 1) within a relatively small horizontal space. The relatively large diameter of housing 18, in turn provides the necessary circumferential length need to provide a total area of ports 38 which is equal to or greater than the cross sectional area of vent 34. The area of ports 38 must be at least equal the cross sectional area of vent 34, otherwise the free exhaust of air is hindered and the purpose of having a relatively large diameter vent 34 would be defeated.

Figure 4:
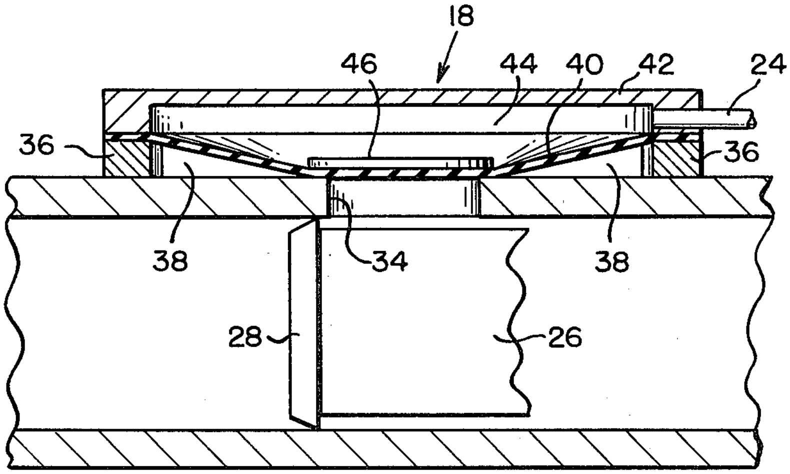
FIG. 4 is a view similar to FIG. 3 showing the valve mechanism in a closed position.

Within valve housing 18, as shown in FIGS. 3 and 4, are the means for sealing vent 34. This includes a flexible diaphragm member 40 which is clamped about its periphery within the housing. Between diaphragm 40 and the top wall 42 of the housing is an air chamber 44 which can be pressurized by fluid entering through branch line 24. Centerally fixed to diaphragm 40 is a rigid disc 46, which has a diameter slightly larger than the diameter of vent 34 for purposes set out hereinbelow.

The operation of the retraction mechanism will be described beginning with the utility line 16 being stored in cylinder 10 and piston 26 being at the rear of the cylinder as shown in FIG. 2. By pulling on utility line 16 and withdrawing it from storage within the cylinder, piston 26 is carried toward the front of the cylinder. Air trapped between piston 26 and the front end wall 12 of the cylinder is pushed through vent 34 into valve housing 18 and out of the housing through the elongated ports 38. Since a cross sectional area of 34 is relatively large and is at least matched by the cross sectional area of ports 38, there is no restriction impeding the exhaust of air so that very little effort is required to move the pistons toward the end wall 12.

When retraction of the utility line 16 is desired, fluid under pressure is applied to line 20 by any suitable means (not shown). The pressurized fluid simultaneously enters cylinder 10 through branch 22 and into chamber 44 through branch 24. Pressurizing chamber 44 deforms membrane 40 so that it seals against the wall of cylinder 10 about vent 34 (FIG. 4). Since disc 46 is relatively rigid and has a larger diameter than vent 34, it helps to seal the membrane about vent 34 and prevents the membrane from deforming into the vent.

With vent 34 sealed in this fashion, pressure applied through branch 22 of the cylinder pushes piston 26 to the position shown in FIG. 2, thereby retracting utility line 16 back into the cylinder.

It is preferred that when piston 26 is in its forward position, seal 28 does not reach vent opening 34. Otherwise, pressurized air could flow into the vent opening and around seal 28 making it difficult to begin moving piston 26 to the retracted position. However, even with the seal 28 located across the vent opening it is believed that sufficient pressure could be generated to move the piston. This is because the path into the vent opening and around seal 28 (with the vent closed by diaphragm 40) is much smaller than the total cross sectional area of the vent when it is open.

In summary, then, the pneumatic retraction mechanism of the present invention including the cylinders, the relatively large air vents 34 for each cylinder and the large diameter, flat value housing 18 for closing vent 34 provides a construction with several advantages. For example, the large vent allows the free unrestricted exhaust of air from the cylinder so that pistons can be moved effortlessly when the utility line is withdrawn from the cylinder. The flat and larger diameter valve housing for sealing the vent provides, on the one hand, a valve exhaust which is at least equals in cross sectional area to area of vent 34, so that the sealing valve in no way restricts the passage of air from the cylinder. On the other hand, the large diameter and the relatively low profile of valve housing 18 occupies an minimum of space so that several cylinders, together with the attached valve housing occupies a minimum of space when placed side by side as shown in FIG. 1.

I claim:

1. A take up system for the utility lines of a dental unit or the like comprising:

(a) a storage chamber for a utility line, said chamber defining an air cylinder wherein the utility line extends into said chamber through a front end wall thereof;

(b) a piston within said chamber and operatively connected to said utility line such that movement of the utility line out of said chamber moves said piston towards said front end wall and retraction of the utility line is accomplished by pressurizing said chamber to move said piston away from said front end wall;

(c) said chamber having a vent adjacent said front end wall to permit the free exhaust of air from said chamber as withdrawal of the utility line moves said piston towards said front end wall;

(d) a pressure operated valve for sealing said vent including a valve housing fixed to the exterior of a side wall of said chamber about said vent, said housing having a plurality of elongated exhaust ports disposed about its periphery, the total area of said ports being at least substantially equal to the cross sectional area of said vent;

(e) a flexible diaphragm in said valve housing, said diaphragm being normally spaced from said vent so as to define a free air passage between said vent and exhaust ports; and (f) means for introducing fluid under pressure simultaneously into said chamber and valve housing for moving said diaphragm against said side wall to a sealing position over said vent and for pressurizing said chamber to move said piston away from said front end wall.

2. A utility take-up system as in claim 1 wherein said housing stands on legs spaced about its periphery, said elongated exhaust ports being defined by the area between said legs wherein said legs define the ends of said ports and said housing and said side wall of said chamber define the long sides of said ports.

3. A utility line take-up system as in claim 1 including a disc on the surface of said diaphragm away from said vent, said disc having a diameter larger than the diameter of said vent to prevent deformation of said diaphragm into said vent when said valve housing is pressurized.

4. A utility line take-up system as in claim 1 wherein said piston has a sliding fluid tight seal about its periphery, said vent being located so that when said piston is in a position adjacent the front end wall of said chamber, said sliding seal on said piston remains wholly in contact with said chamber and does not overlap said vent.

* * * * *